United States Patent
Lao et al.

(10) Patent No.: US 12,320,523 B2
(45) Date of Patent: Jun. 3, 2025

(54) SUPPORT PIN FOR IGNITER ASSEMBLY

(71) Applicant: Pratt & Whitney Canada Corp., Québec (CA)

(72) Inventors: Si-Man Lao, Mississauga (CA); Katherine Little, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/480,933

(22) Filed: Oct. 4, 2023

(65) Prior Publication Data
US 2025/0116404 A1    Apr. 10, 2025

(51) Int. Cl.
| | |
|---|---|
| *F23R 3/60* | (2006.01) |
| *F02C 7/266* | (2006.01) |
| *H01T 13/06* | (2006.01) |
| *H01T 13/08* | (2006.01) |
| *H01T 13/16* | (2006.01) |

(52) U.S. Cl.
CPC ............ *F23R 3/60* (2013.01); *F02C 7/266* (2013.01); *H01T 13/06* (2013.01); *H01T 13/08* (2013.01); *H01T 13/16* (2013.01)

(58) Field of Classification Search
CPC .......... F02C 7/266; F05D 2260/99; F23R 3/425–46; F23R 3/50–54; F23R 3/58–60; H01T 13/06; H01T 13/08; H01T 13/16
See application file for complete search history.

(56) References Cited

U.S. PATENT DOCUMENTS

| | | | |
|---|---|---|---|
| 7,546,739 B2 | 6/2009 | Holland et al. | |
| 9,080,771 B2 | 7/2015 | Bunel et al. | |
| 10,968,829 B2 | 4/2021 | Cunha et al. | |
| 2009/0178385 A1 | 7/2009 | Sandelis | |

(Continued)

FOREIGN PATENT DOCUMENTS

| | | |
|---|---|---|
| CN | 108005790 A | 5/2018 |
| EP | 3543609 A1 | 9/2019 |

(Continued)

OTHER PUBLICATIONS

Database WPI, Week 201833, Thomson Scientific, London, GB; AN 2018-37451C, XP002812806 & CN 108 005 790 A, 1 page.

(Continued)

*Primary Examiner* — Scott J Walthour
(74) *Attorney, Agent, or Firm* — CANTOR COLBURN LLP (57) ABSTRACT

A support pin of a combustor assembly is provided. The combustor assembly includes a casing of a combustor and an igniter. The igniter includes a main section and a tip from which sparks generated by the igniter within the main section are ejected. The support pin includes an exterior section, a main body and a tip section. The exterior section is connectable to the casing. The igniter is affixable to the exterior section. The main body is integrally formed with the exterior section and is disposable to surround the main section of the igniter. The main body has a first wall thickness and defines support pin holes. The tip section is integrally formed with the main body and is disposable to surround the tip of the igniter. The tip section has a second wall thickness. The second wall thickness exceeds the first wall thickness.

20 Claims, 4 Drawing Sheets

(56) References Cited

U.S. PATENT DOCUMENTS

| | | | | |
|---|---|---|---|---|
| 2011/0113748 A1* | 5/2011 | Lains | ............ | F02C 7/266 |
| | | | | 60/722 |
| 2013/0327013 A1* | 12/2013 | Leglaye | ............ | F02C 7/266 |
| | | | | 313/11.5 |
| 2018/0283689 A1* | 10/2018 | Wang | ............ | F23R 3/06 |
| 2018/0363561 A1* | 12/2018 | Gonyou | ............ | F02C 3/04 |
| 2019/0218917 A1* | 7/2019 | Garay | ............ | F01D 9/02 |

FOREIGN PATENT DOCUMENTS

| | | |
|---|---|---|
| FR | 3088412 A1 | 5/2020 |
| GB | 2445576 A | 7/2008 |

OTHER PUBLICATIONS

Extended European Search Report for EP Application No. 24204833.8, dated Jan. 16, 2025, pp. 1-10.

* cited by examiner

SUPPORT PIN FOR IGNITER ASSEMBLY

BACKGROUND

The present disclosure relates to gas turbine engines and, in particular, to a support pin for an igniter assembly of a cooling basket of a gas turbine engine.

In a gas turbine engine, fuel and compressed air are combusted in a combustor to produce a high-temperature and high-pressure fluid. This fluid enters a turbine and interacts with rows or stages of turbine blades and vanes. The interaction between the high-temperature and high-pressure fluid with the turbine blades and vanes causes the stages of turbine blades to rotate a rotor. The rotor rotation drives a compressor to compress the air for the combustor and, as noted above, can be used to drive operations of a generator to produce electricity and/or for propulsion.

SUMMARY

According to an aspect of the disclosure, a support pin of a combustor assembly is provided. The combustor assembly includes a casing of a combustor and an igniter. The igniter includes a main section and a tip from which sparks generated by the igniter within the main section are ejected. The support pin includes an exterior section, a main body and a tip section. The exterior section is connectable to the casing. The igniter is affixable to the exterior section. The main body is integrally formed with the exterior section and is disposable to surround the main section of the igniter. The main body has a first wall thickness and defines support pin holes. The tip section is integrally formed with the main body and is disposable to surround the tip of the igniter. The tip section has a second wall thickness. The second wall thickness exceeds the first wall thickness.

In accordance with additional or alternative embodiments, the support pin holes are disposed in an array surrounding the igniter.

In accordance with additional or alternative embodiments, at least one or more of the support pin holes includes at least one of a venturi element and a turbulator.

In accordance with additional or alternative embodiments, the main body defines first support pin holes and the tip section defines second support pin holes.

According to an aspect of the disclosure, a combustor assembly is provided and includes a combustor wall defining an interior, a casing disposed about the combustor wall to define a space for air flow, an igniter to generate sparks to initiate combustion within the interior and a support pin connected to the casing and configured to support the igniter to extend through the space. The support pin defines support pin holes through which the air flow passes to impinge upon the igniter.

In accordance with additional or alternative embodiments, the air flow is drawn from compressed air supplied for the combustion.

In accordance with additional or alternative embodiments, the igniter includes electrical elements configured to generate the sparks and an igniter body. The igniter includes a main section surrounding the electrical elements and defining through-holes by which the air flow, having passed through the support pin holes, enters an igniter interior, and a tip coplanar with the combustor wall and facing the interior from which the sparks are ejected.

In accordance with additional or alternative embodiments, the support pin includes a main body surrounding the main section of the igniter body, the main body having a first wall thickness and defining the support pin holes, and a tip section surrounding the tip of the igniter body and having a second wall thickness exceeding the first wall thickness.

In accordance with additional or alternative embodiments, the combustor wall and the casing define first and second apertures, respectively, and the support pin is connected to the casing at the second aperture and is configured to support the igniter between the first and second apertures.

In accordance with additional or alternative embodiments, the support pin holes are disposed in an array surrounding the igniter.

In accordance with additional or alternative embodiments, at least one or more of the support pin holes includes at least one of a venturi element and a turbulator.

According to an aspect of the disclosure, a combustor assembly is provided and includes a combustor wall defining an interior and including a flange defining flange openings, a casing disposed about the combustor wall to define a space for air flow, an igniter to generate sparks to initiate combustion within the interior, the igniter including a main section and a tip from which the sparks are ejected, and a support pin connected to the casing and configured to support the igniter to extend through the space. The support pin defines first support pin holes through which a first portion of the air flow passes to impinge upon the main section and second support pin holes corresponding to the flange openings and through which a second portion of the air flow, having passed through the flange openings, passes to impinge upon the tip.

In accordance with additional or alternative embodiments, the air flow is drawn from compressed air supplied for the combustion.

In accordance with additional or alternative embodiments, the igniter includes electrical elements configured to generate the sparks and an igniter body comprising the main section and the tip. The main section surrounds the electrical elements and defines through-holes by which the air flow, having passed through the first support pin holes, enters an igniter interior. The tip is coplanar with the combustor wall and faces the interior.

In accordance with additional or alternative embodiments, the support pin includes a main body surrounding the main section of the igniter body, the main body having a first wall thickness and defining the first support pin holes, and a tip section surrounding the tip of the igniter body, the tip section having a second wall thickness exceeding the first wall thickness and defining the second support pin holes.

In accordance with additional or alternative embodiments, the combustor wall and the casing define first and second apertures, respectively, and the support pin is connected to the casing at the second aperture and is configured to support the igniter between the first and second apertures.

In accordance with additional or alternative embodiments, the first support pin holes are disposed in an array surrounding the igniter.

In accordance with additional or alternative embodiments, at least one or more of the first support pin holes includes at least one of a venturi element and a turbulator.

In accordance with additional or alternative embodiments, the flange openings are round and the second support pin holes are slots.

In accordance with additional or alternative embodiments, the flange openings are slots and the second support pin holes are round.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The following disclosure is applicable to any type of gas turbine engine, including, but not limited to, turbofans, turboshafts, turboprops, turbojets, etc. The gas turbine engine described below is provided by way of example, and should not be interpreted as limiting the scope of the application or the claims in any way.

Figure 1:
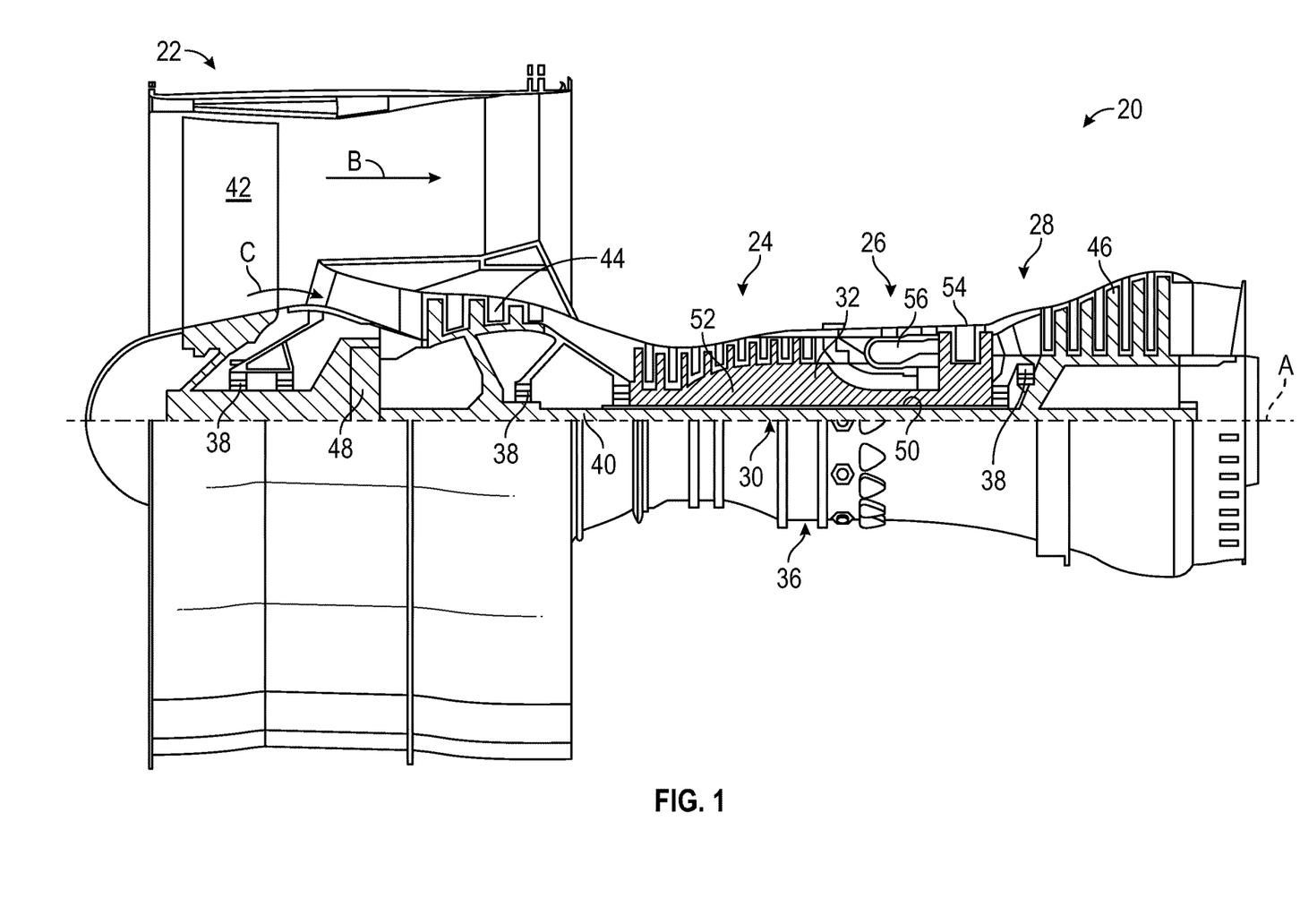
FIG. 1 is a partial cross-sectional view of a portion of an exemplary gas turbine engine in accordance with embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The combustor section 26 typically includes a combustor wall, which is formed to define an interior in which combustion occurs, a casing that surrounds an exterior of the combustor wall and igniters. The igniters generate sparks that initiate combustion within the interior. As such, the igniters are often subject to significant and constant heat loading while having to house sensitive electrical components for spark generation. This heat loading is increasing as combustion gas temperatures are increasing even while spare cooling air is becoming increasingly scarce. Heat loading is also increasing due to other factors including, but not limited to, high speed flows and special combustion conditions, such as fuel impingement.

A need therefore exists for a system to increase cooling of the igniters of a combustion system.

Thus, as will be described below, a cooling basket support pin design is provided for use in an igniter assembly of a gas turbine engine. The cooling basket support pin design is characterized as having a number of small holes defined therein to generate impingement cooling on an exterior of an igniter prior to having the same air enter the interior of the igniter for additional cooling. Cooling effectiveness for the igniter can thus be increased without any or significant increase in air consumption. In some, but not all cases, the igniter can be provided with materials that can handle higher temperatures without cooling, there can be increased cooling flow through the inside of the igniter and cooling fins can be added to the exterior of the igniter.

Figure 2:
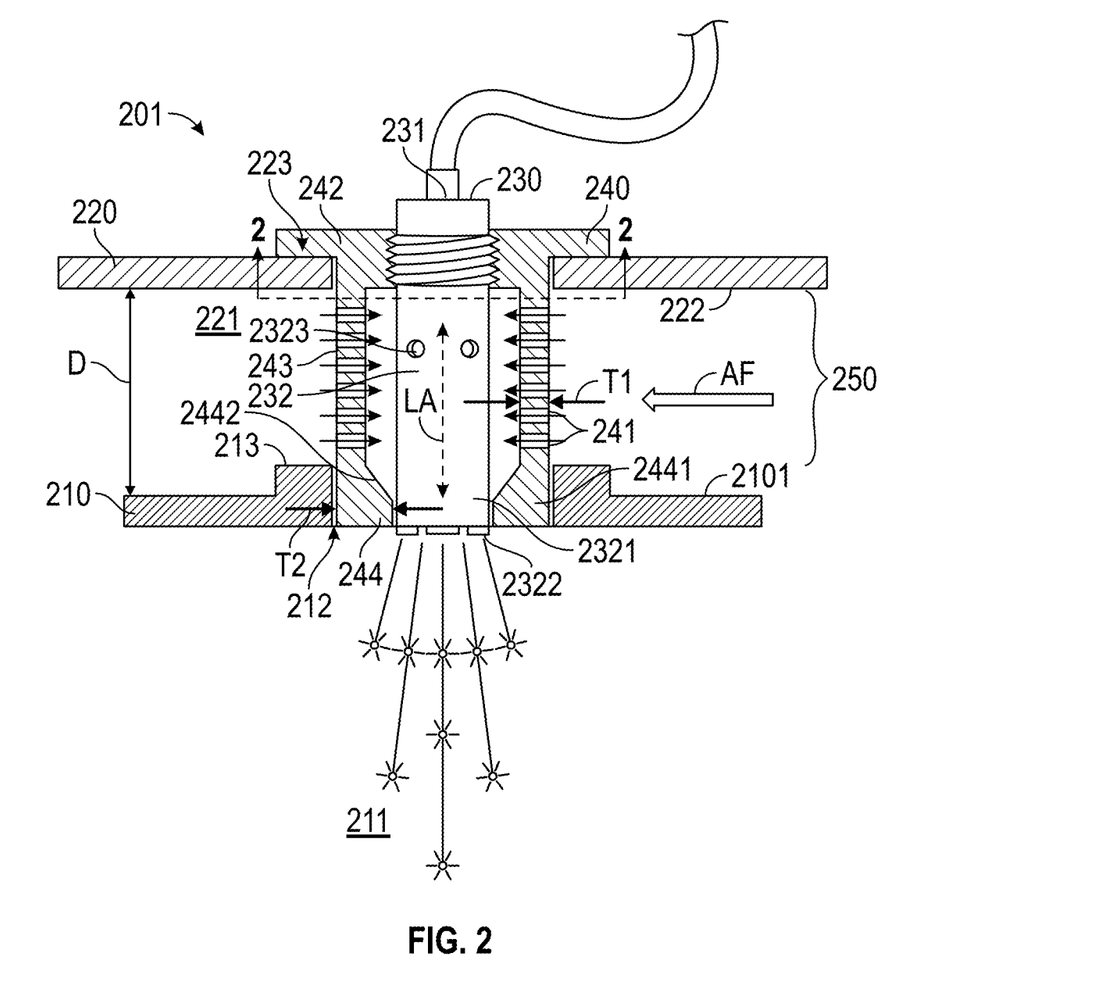
FIG. 2 is a side view of a combustor assembly in accordance with embodiments.

With reference to FIG. 2, a combustor assembly 201 is provided and includes a combustor wall 210 defining an interior 211 in which combustion occurs and a first aperture 212, a casing 220, an igniter 230 and a support pin 240. The combustor wall 210 includes a flange 213 at and around the first aperture 212. The casing 220 is disposed about the combustor wall 210 at a distance D to define a space 221 for air flow AF between an exterior surface 2101 of the combustor wall 210 and an interior surface 222 of the casing 220. The air flow AF can include or be provided as a cooling air flow which is drawn from compressed air supplied to the interior 211 from a compressor, such as compressor section 24 of the gas turbine engine 20 of FIG. 1. The casing 220 is configured to maintain a pressure for the combustion inside the combustor wall 210 and defines a second aperture 223. The igniter 230 includes electrical elements 231 that are configured to generate sparks to initiate combustion within the interior 211 and an igniter body 232. The support pin 240 is connected to the casing 220 and is configured to support the igniter 230 such that the igniter 230 extends longitudinally along longitudinal axis LA through the space 221 and between the first aperture 212 and the second aperture 223. The support pin 240 defines support pin holes 241 through which the air flow AF passed to impinge upon an exterior of the igniter body 232 of the igniter 230. The support pin holes 241 cooperatively form a cooling basket 250.

The impingement of the air flow AF on the exterior of the igniter body 232 of the igniter 230 provides additional cooling to the igniter 230 without the cost of drawing additional air from the space 221 and without air from any other source. This, in turn, allows the combustor assembly 201 to be operated at increased power and correspondingly increased temperatures without risking damage to the igniter 230 and without requiring that the igniter 230 be redesigned or otherwise provided with materials that are able to withstand elevated temperatures.

The igniter body 232 includes a main section 2321 and a tip 2322. The main section 2321 surrounds the electrical elements 231 and defines through-holes 2323 by which the air flow AF, having passed through the support pin holes 241, enters an interior of the igniter 230 to further cool the electrical elements 231. The tip 2322 can be, but is not required to be, generally coplanar with the combustor wall 210 and faces the interior 211. The sparks generated by the electrical elements 231 of the igniter 230 are ejected into the interior 211 from the tip 2322.

The support pin 240 can include an exterior section 242, a main body 243 and a tip section 244. The exterior section 242 is connectable to the casing 220 at the second aperture 223. The igniter 230 can be affixable to the exterior section 242 by threading, for example, or by other suitable features. The main body 243 is integrally formed with the exterior section 242 and is disposable to surround the main section 2321 of the igniter body 232. The main body 243 has a first wall thickness T1 and defines the support pin holes 241. The tip section 244 is disposable to surround the tip 2322 of the igniter body 232 at the first aperture 212. The tip section 244 includes a tip section end 2441 and a tapered section 2442. The tip section end 2441 has a second wall thickness T2. The second wall thickness T2 exceeds the first wall thickness T1. The tapered section 2442 is interposed between the main body 243 and the tip section end 2441 and has a thickness that increases inwardly toward the tip 2322 of the igniter body 232.

Figure 3A:
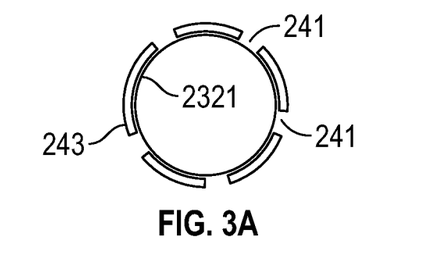
FIG. 3A is an axial view of a support pin and an igniter of the combustor assembly of FIG. 2 taken along line 2-2 in accordance with embodiments.
Figure 3B:
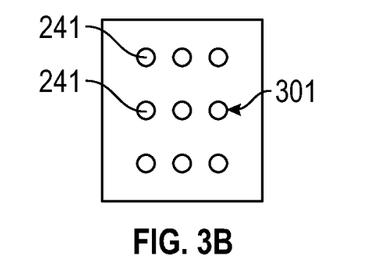
FIG. 3B is a plan view of support pin holes of the support pin of FIGS. 2 and 3A in an array in accordance with embodiments.

With reference to FIGS. 3A and 3B and in accordance with embodiments, the support pin holes 241 are disposed in an array 301 surrounding the igniter 230. As shown in FIG. 3B, the array 301 can be provided as a lattice array with rows and columns of support pin holes 241. Although the array 301 is illustrated in FIG. 3B as being a non-staggered array, it is to be understood that other embodiments are possible including, but not limited to, embodiments in which the array 301 is a staggered array.

Figure 4:
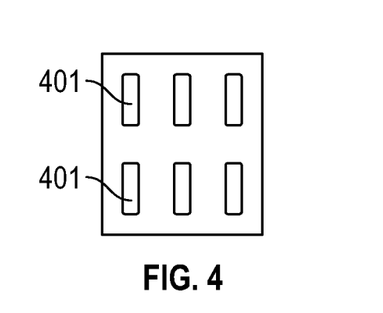
FIG. 4 is a plan view of support pin holes of the support pin of FIGS. 2 and 3A with slot shapes in accordance with embodiments.

With reference to FIG. 4 and in accordance with embodiments, one or more of the support pin holes 241 can be provided as a slot 401.

Figure 5:
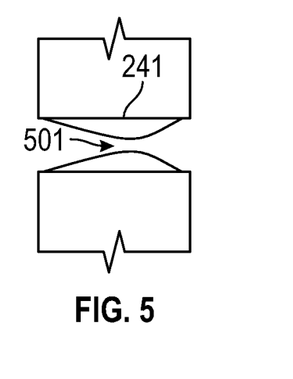
FIG. 5 is a side schematic view of a support pin hole with a venturi element in accordance with embodiments.
Figure 6:
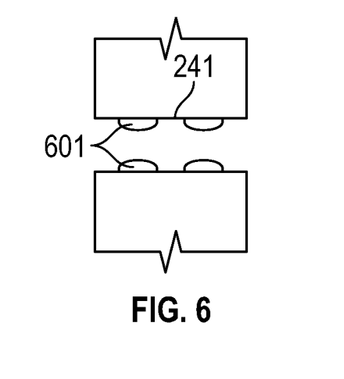
FIG. 6 is a side schematic view of a support pin hole with turbulators in accordance with embodiments.

With reference to FIGS. 5 and 6 and in accordance with embodiments, at least one or more of the support pin holes 241 can include at least one of a venturi element 501 (see FIG. 5) to locally increase a velocity of the air flow AF and a turbulator 601 (see FIG. 6) to locally increase a turbulence of the air flow AF.

Figure 7:
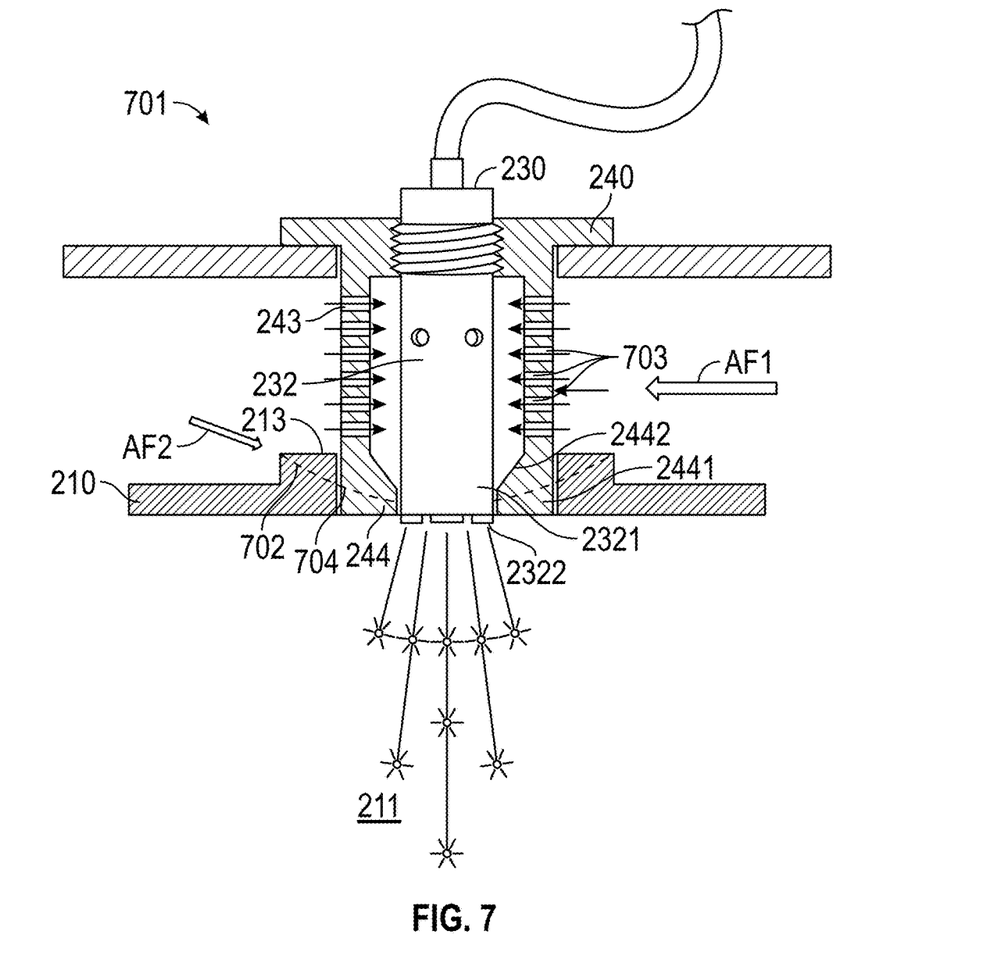
FIG. 7 is a side view of a combustor assembly with first and second support pin holes in accordance with embodiments.

With reference to FIG. 7, a combustor assembly 701 is provided. The combustor assembly 701 is generally similar to the combustor assembly 201 of FIG. 2 (and of FIGS. 3-6) and thus will not be described in detail except as combustor assembly 701 differs from combustor assembly 201.

As shown in FIG. 7, in the combustor assembly 701, the combustor wall 210 includes the flange 213 and the flange 213 defines flange openings 702. Further, the main body 243 of the support pin 240 defines first support pin holes 703 through which a first portion of the air flow AF1 passes to impinge upon the main section 2321 of the igniter body 232 of the igniter 230 and the tip section 244 of the support pin 240 defines second support pin holes 704. Each of the second support pin holes 704 corresponds in position to a corresponding one of the flange openings 702. A second portion of the air flow AF2, having passed through the flange openings 702, passes through the second support pin holes 704 to impinge upon the tip 2322 of the igniter body 232 of the igniter 230.

A quantity of dedicated coolant can thus be directed by the flange openings 702 and the second support pin holes 704 toward the tip 2322 of the igniter body 232 of the igniter 230, which may be the portion of the igniter 230 that is most likely to be heated by combustion effects in the interior 211. Therefore, additional cooling of the tip 2322 is possible.

Figure 8:
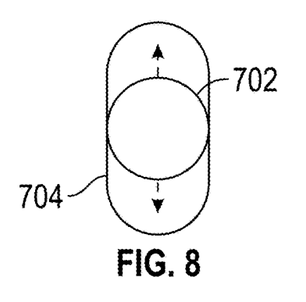
FIG. 8 is a schematic illustration of round flange openings and slotted support pin holes in accordance with embodiments.
Figure 9:
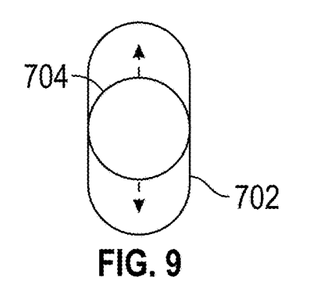
FIG. 9 is a schematic illustration of slotted flange openings and round support pin holes in accordance with embodiments.

With reference to FIGS. 8 and 9 and in accordance with embodiments, the flange openings 702 can be round and the second support pin holes 704 can be slots (see FIG. 8) or, in the alternative, the flange openings 702 can be slots and the second support pin holes 704 can be round (see FIG. 9). In either case, differential thermal expansion between the combustor wall 210 and the support pin 240 can be absorbed and accounted for by the varied shapes of the flange openings 702 and the second support pin holes 704.

It is to be understood that the embodiments of FIG. 2 (and of FIGS. 3-6) and the embodiments of FIG. 7 (and of FIGS. 8 and 9) can be combined or provided separately. Moreover, although not illustrated or described above, it is to be understood that the second support pin holes 704 of FIG. 7 (and of FIGS. 8 and 9) can be provided alone and without the first support pin holes 703 of FIG. 7.

Technical effects and benefits of the present disclosure are the provision of a cooling basket support pin design for use in an igniter assembly of a gas turbine engine which can increase igniter durability in a relatively simple way and which can be introduced to both new and legacy gas turbine engines.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A support pin of a combustor assembly comprising a casing of a combustor and an igniter comprising a main section and a tip from which sparks generated by the igniter within the main section are ejected, the support pin comprising:
   an exterior section, which is connectable to the casing and to which the igniter is affixable;
   a main body integrally formed with the exterior section and disposable to surround the main section of the igniter, the main body having a first longitudinal length defined along the main section of the igniter and a first wall thickness extending along the first longitudinal length and defining support pin holes; and
   a tip section integrally formed with the main body and disposable to surround the tip of the igniter, the tip section comprising:
   a tip section end having a second longitudinal length defined along the tip of the igniter and a second wall thickness extending along the second longitudinal length and exceeding the first wall thickness; and
   a tapered section interposed between the main body and the tip section end and having a thickness that increases inwardly toward the tip of the igniter.

2. The support pin according to claim 1, wherein, with the exterior section connected to the casing, the support pin holes are disposed in an array surrounding the igniter.

3. The support pin according to claim 1, wherein at least one or more of the support pin holes comprises at least one of a venturi element and a turbulator.

4. The support pin according to claim 1, wherein:
   the exterior section is connected to the casing,
   the combustor comprises a combustor wall comprising a flange that terminates at an intersection of the main body and the tapered section and defines flange openings,
   the main body defines first support pin holes and the tip section defines second support pin holes, and
   each of the second support pin holes corresponds in position to a corresponding one of the flange openings.

5. A combustor assembly, comprising:
   a combustor wall defining an interior;
   a casing disposed about the combustor wall to define a space for air flow;
   an igniter to generate sparks to initiate combustion within the interior; and
   a support pin connected to the casing and configured to surround and support the igniter to extend through the space,
   the support pin comprising a main body having a first longitudinal length defined along the igniter and a first wall thickness extending along the first longitudinal length and defining support pin holes through which the air flow passes to impinge upon the igniter and a tip section comprising:
   a tip section end having a second longitudinal length defined along the igniter and a second wall thickness extending along the second longitudinal length and exceeding the first wall thickness; and
   a tapered section interposed between the main body and the tip section end and having a thickness that increases inwardly toward the igniter.

6. The combustor assembly according to claim 5, wherein the air flow is drawn from compressed air supplied for the combustion.

7. The combustor assembly according to claim 5, wherein the igniter comprises:
   electrical elements configured to generate the sparks; and
   an igniter body, comprising:
   a main section surrounding the electrical elements and defining through holes by which the air flow, having passed through the support pin holes, enters an igniter interior; and
   a tip coplanar with the combustor wall and facing the interior from which the sparks are ejected.

8. The combustor assembly according to claim 7, wherein:
   the main body surrounds the main section of the igniter body, and
   the tip section surrounds the tip of the igniter body.

9. The combustor assembly according to claim 5, wherein:
   the combustor wall and the casing define first and second apertures, respectively, and
   the support pin is connected to the casing at the second aperture and is configured to support the igniter between the first and second apertures.

10. The combustor assembly according to claim 5, wherein the support pin holes are disposed in an array surrounding the igniter.

11. The combustor assembly according to claim 5, wherein at least one or more of the support pin holes comprises at least one of a venturi element and a turbulator.

12. A combustor assembly, comprising:
    a combustor wall defining an interior and comprising a flange defining flange openings;
    a casing disposed about the combustor wall to define a space for air flow;
    an igniter to generate sparks to initiate combustion within the interior, the igniter comprising a main section and a tip from which the sparks are ejected; and
    a support pin connected to the casing and configured to surround and support the igniter to extend through the space, the support pin comprising a main body having a first longitudinal length defined along the igniter and a first wall thickness extending along the first longitudinal length and defining first support pin holes through which a first portion of the air flow passes to impinge upon the main section and a tip section defining second support pin holes corresponding to the flange openings and through which a second portion of the air flow, having passed through the flange openings, passes to impinge upon the tip, the tip section comprising:
    a tip section end having a second longitudinal length defined along the igniter and a second wall thickness extending along the second longitudinal length and exceeding the first wall thickness; and a tapered section interposed between the main body and the tip section end and having a thickness that increases inwardly toward the igniter.

13. The combustor assembly according to claim 12, wherein the air flow is drawn from compressed air supplied for the combustion.

14. The combustor assembly according to claim 12, wherein:
the igniter comprises electrical elements configured to generate the sparks and an igniter body comprising the main section and the tip,
the main section surrounds the electrical elements and defines through-holes by which the air flow, having passed through the first support pin holes, enters an igniter interior, and
the tip is coplanar with the combustor wall and faces the interior.

15. The combustor assembly according to claim 14, wherein:
the main body surrounds the main section of the igniter body, and
the tip section surrounds the tip of the igniter body.

16. The combustor assembly according to claim 12, wherein:
the combustor wall and the casing define first and second apertures, respectively, and
the support pin is connected to the casing at the second aperture and is configured to support the igniter between the first and second apertures.

17. The combustor assembly according to claim 12, wherein the first support pin holes are disposed in an array surrounding the igniter.

18. The combustor assembly according to claim 12, wherein at least one or more of the first support pin holes comprises at least one of a venturi element and a turbulator.

19. The combustor assembly according to claim 12, wherein the flange openings are round and the second support pin holes are slots.

20. The combustor assembly according to claim 12, wherein the flange openings are slots and the second support pin holes are round.

* * * * *